United States Patent
Synal et al.

(10) Patent No.: US 10,645,048 B2
(45) Date of Patent: May 5, 2020

(54) LOCKING OPEN GROUP CHAT COMMUNICATIONS

(71) Applicant: T-Mobile USA, Inc., Bellevue, WA (US)

(72) Inventors: Adrian Synal, Kirkland, WA (US); Shelby Seward, North Bend, WA (US)

(73) Assignee: T-Mobile USA, Inc., Bellevue, WA (US)

( * ) Notice: Subject to any disclaimer, the term of this patent is extended or adjusted under 35 U.S.C. 154(b) by 144 days.

(21) Appl. No.: 15/937,691

(22) Filed: Mar. 27, 2018

(65) Prior Publication Data

US 2019/0306101 A1 Oct. 3, 2019

(51) Int. Cl.
*H04L 12/58* (2006.01)
*H04L 29/06* (2006.01)

(52) U.S. Cl.
CPC .............. *H04L 51/16* (2013.01); *H04L 51/04* (2013.01); *H04L 51/38* (2013.01); *H04L 63/04* (2013.01); *H04L 65/1006* (2013.01); *H04L 65/1016* (2013.01); *H04L 65/1063* (2013.01)

(58) Field of Classification Search
CPC ......... H04L 65/00–80; H04L 51/00–38; H04L 63/00–0492
See application file for complete search history.

(56) References Cited

U.S. PATENT DOCUMENTS

| | | | | |
|---|---|---|---|---|
| 2015/0286790 | A1* | 10/2015 | Ahmad | G06F 17/2705 705/2 |
| 2018/0183619 | A1* | 6/2018 | Jayaram | H04L 51/16 |
| 2018/0192260 | A1* | 7/2018 | Lee | H04L 51/04 |

OTHER PUBLICATIONS

RCC.62—joyn Crane Definition Document version 3.0, Feb. 20, 2016, GSMA, pp. 1-213 (Year: 2016).*
GSM Association, Rich Communication Suite 6.0 Advanced Communications Services and Client Specification, Version 7—Final Draft (Feb. 19, 2016), 581 pages.

* cited by examiner

*Primary Examiner* — Clayton R Williams
(74) *Attorney, Agent, or Firm* — Han Santos, PLLC

(57) ABSTRACT

An example method is performed by a rich communications services (RCS) server. The RCS server maintains metadata and RCS messages associated with a message thread, where the message thread provides open group chat (OGC) communications among a plurality of participants. The RCS server receives a lock request from a participant of the message thread to lock the message thread and in response thereto modifies the metadata associated with the message thread to indicate that the message thread is locked. A request to join the message thread is then received by the RCS server, where the request is rejected in response to the RCS server determining that the metadata associated with the message thread indicates that the message thread is locked.

20 Claims, 6 Drawing Sheets

LOCKING OPEN GROUP CHAT COMMUNICATIONS

BACKGROUND

Wireless communication systems have developed through various generations, including a first-generation analog wireless phone service (1G), a second-generation (2G) digital wireless phone service (including interim 2.5G and 2.75G networks) and third-generation (3G) and fourth-generation (4G) high speed data/Internet-capable wireless services. There are presently many different types of wireless communication systems in use, including Cellular and Personal Communications Service (PCS) systems. Examples of known cellular systems include the cellular Analog Advanced Mobile Phone System (AMPS), and digital cellular systems based on Code Division Multiple Access (CDMA), Frequency Division Multiple Access (FDMA), Time Division Multiple Access (TDMA), the Global System for Mobile access (GSM) variation of TDMA, and newer hybrid digital communication systems using both TDMA and CDMA technologies.

More recently, Long Term Evolution (LTE) has been developed as a wireless communications protocol for wireless communication of high-speed data for mobile phones and other data terminals. LTE is based on GSM, and includes contributions from various GSM-related protocols such as Enhanced Data rates for GSM Evolution (EDGE), and Universal Mobile Telecommunications System (UMTS) protocols such as High-Speed Packet Access (HSPA).

Access networks using various communication protocols (e.g., 3GPP access networks such as W-CDMA, LTE, etc., or non-3GPP access networks such as WiFi, WLAN or wired LAN, etc.) can be configured to provide Internet Protocol (IP) Multimedia Subsystem (IMS) services via an IMS network managed by a mobile network operator (e.g., T-MOBILE®) to users across a communications system. Users that access the IMS network to request an IMS service are assigned to one of a plurality of regional application servers or application server clusters (e.g., groups of application servers that serve the same cluster region) for supporting the requested IMS service.

One type of communication that may be supported by IMS services may be referred to as Rich Communication Services (RCS). RCS is designed to provide enhanced communications between mobile devices, including mobile devices that are supported by different operators. Among other things, RCS provides for enhanced messaging, which may include chat, file sharing, location sharing, and so forth.

BRIEF DESCRIPTION OF THE DRAWINGS

The detailed description is described with reference to the accompanying figures, in which the left-most digit(s) of a reference number identifies the figure in which the reference number first appears. The use of the same reference numbers in different figures indicates similar or identical items.

DETAILED DESCRIPTION

Figure 1:
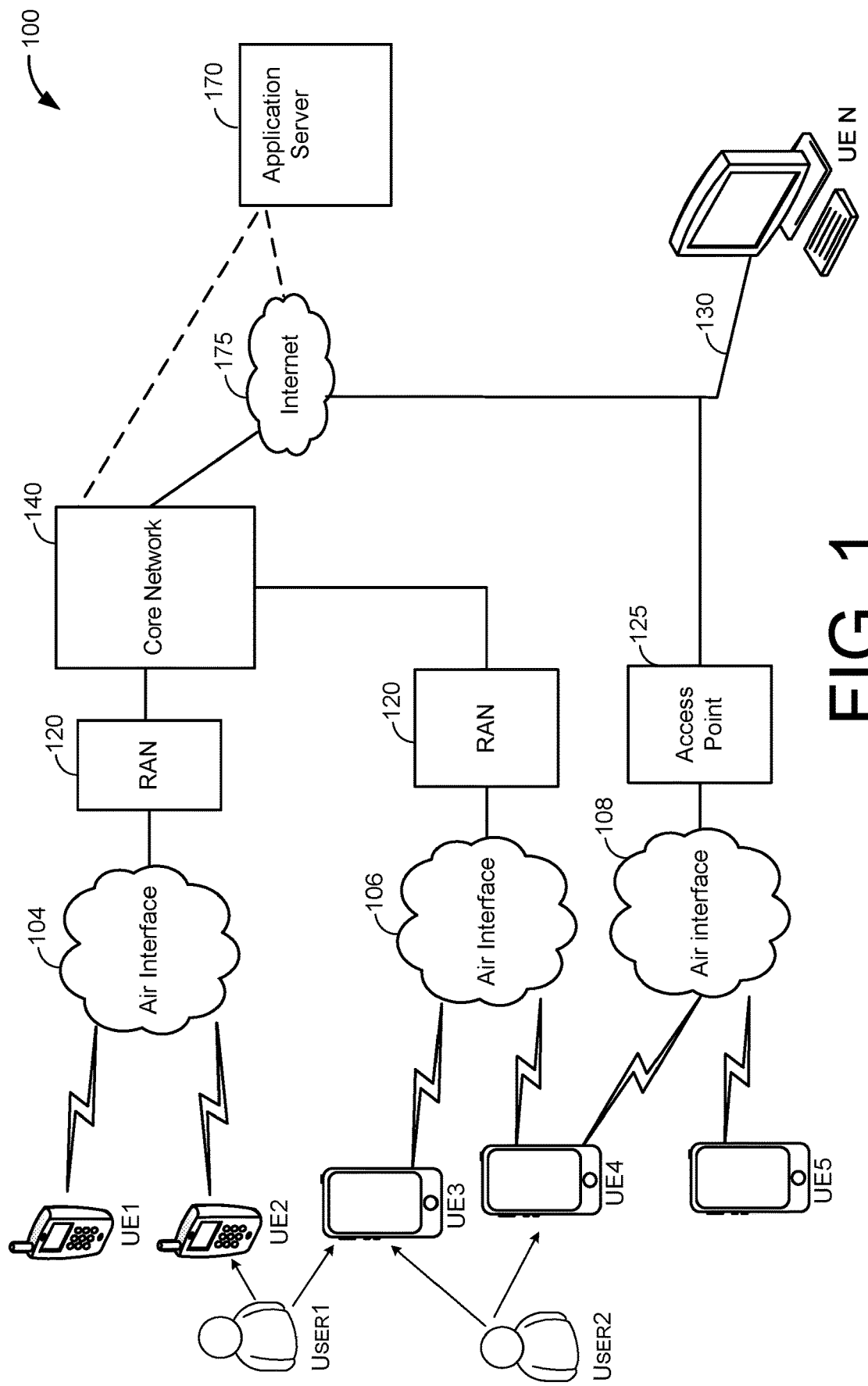
FIG. 1 illustrates an example architecture of a wireless communication network.

Aspects of the present disclosure are directed to a rich communications services (RCS) server, computer-readable media, and processes for locking open group chat communications.

In one aspect, RCS combines different services defined by 3GPP and Open Mobile Alliance (OMA) with an enhanced phonebook. For example, one UE's capabilities and presence information can be discovered and displayed by another UE. RCS reuses the 3GPP-specified IMS core system as the underlying service platform taking care of issues such as authentication, authorization, registration, charging and routing.

As will be described in more detail below, an RCS server, according to aspects of the present disclosure, may be configured to provide enhanced messaging services, such as Standalone Messaging, 1-to-1 Chat, Open Group Chat, File Transfer, Content Sharing, Social Presence Information, IP Voice call, Best Effort Video call, Geolocation Exchange, Audio Messaging, Network based blacklist, and Capability Exchange, just to name a few.

According to some aspects, an RCS server may be configured to maintain a plurality of message threads, where each message thread provides open group chat (OGC) communications among a plurality of participants. OGC may refer to any form of synchronous or asynchronous conferencing. On one aspect, OGC provides a user with the ability to share information via text with several other users. Generally speaking, a message thread within OGC provides the ability to converse with multiple people participating in the same message thread.

Synchronous conferencing may include audio/video conferencing and/or instant messaging systems that provide a text-based multi-user chat function. In some aspects, synchronous conferencing refers to conferencing in real-time, as distinct from a system such as e-mail, where messages are left and answered later.

Asynchronous conferencing may allow for the participants to have flexibility and control over the time they spend on any topic. For example, asynchronous conferencing may allow all the participants to contribute and communicate simultaneously on different topics, where the user can participate from anywhere, as long as there is connection to the message thread. Also, the message thread can be accessed at any time which may give the participant time to think and reply.

Both synchronous and asynchronous conferencing are online conferencing where the participants can interact while being physically located at different places in the world. Asynchronous conferencing allows the participants to access the message thread at their convenience while synchronous conferencing requires that all participants be online at the time of conference. In some aspects, an RCS server may provide for an OGC communication that includes a combination of both synchronous and asynchronous conferencing. Both the synchronous and asynchronous conferencing within OGC may give a permanent record of the message thread.

One feature of OGC, is the ability to join existing message threads and/or to invite others to join an existing message thread. However, the message thread may become too "busy" such that communication within the thread becomes cluttered or untenable. In other aspects, a user may be added or joined to a message thread that the originator of the message thread does not want to be included.

For example, a user may start a message thread within OGC to discuss a certain project within a company. The user starts the message thread with 15 people working on the project. However, after that chat session has started the user notices that other participants have been added/joined the message thread that are not necessarily part of the project. Accordingly, aspects of the present disclosure include an RCS server that provides participants of a message thread with the ability to "lock" a message thread such that so no other users may join or be added to the message thread. This may be particularly advantageous in message threads that involve sensitive or private discussions among several participants.

A client device, referred to herein as a user equipment (UE), may be mobile or stationary, and may communicate with a radio access network (RAN) or any other appropriate network. As used herein, the term "UE" may be referred to interchangeably as an "access terminal" or "AT", a "wireless device", a "subscriber device", a "subscriber terminal", a "subscriber station", a "user terminal" or UT, a "mobile terminal", a "mobile station" and variations thereof. Generally, UEs can communicate with a core network via the RAN, and through the core network the UEs can be connected with external networks such as the Internet. Of course, other mechanisms of connecting to the core network and/or the Internet are also possible for the UEs, such as over wired access networks, WiFi networks (e.g., based on IEEE 802.11, etc.) and so on. UEs can be embodied by any of a number of types of devices including but not limited to PC cards, compact flash devices, external or internal modems, wireless or wireline phones, and so on. A communication link through which UEs can send signals to the RAN is called an uplink channel (e.g., a reverse traffic channel, a reverse control channel, an access channel, etc.). A communication link through which the RAN can send signals to UEs is called a downlink or forward link channel (e.g., a paging channel, a control channel, a broadcast channel, a forward traffic channel, etc.).

FIG. 1 illustrates a high-level system architecture of a wireless communication network 100 in accordance with various aspects. The wireless communication network 100 contains UEs 1 . . . N. The UEs 1 . . . N can include cellular telephones, personal digital assistant (PDAs), pagers, a laptop computer, a desktop computer, and so on. For example, in FIG. 1, UEs 1 . . . 2 are illustrated as cellular calling phones, UEs 3 . . . 5 are illustrated as cellular touchscreen phones or smart phones, and UE N is illustrated as a desktop computer or laptop.

Referring to FIG. 1, UEs 1 . . . N are configured to communicate with an access network (e.g., the RAN 120, an access point 125, etc.) over a physical communications interface or layer, shown in FIG. 1 as air interfaces 104, 106, 108 and/or a direct wired connection 130. The air interfaces 104 and 106 can comply with a given cellular communications protocol (e.g., CDMA, EVDO, eHRPD, GSM, EDGE, W-CDMA, LTE, etc.), while the air interface 108 can comply with a wireless IP protocol (e.g., IEEE 802.11). The RAN 120 includes a plurality of access points that serve UEs over air interfaces, such as the air interfaces 104 and 106. The access points in the RAN 120 can be referred to as access nodes or ANs, base stations or BSs, Node Bs, eNode Bs, and so on. These access points can be terrestrial access points (or ground stations), or satellite access points. The RAN 120 is configured to connect to a core network 140 that can perform a variety of functions, including bridging circuit switched (CS) calls between UEs served by the RAN 120 and other UEs served by the RAN 120 or a different RAN altogether, and can also mediate an exchange of packet-switched (PS) data with external networks such as Internet 175. The Internet 175 includes a number of routing agents and processing agents (not shown in FIG. 1 for the sake of convenience). In FIG. 1, UE N is shown as connecting to the Internet 175 directly (i.e., separate from the core network 140, such as over an Ethernet connection of WiFi or 802.11-based network). The Internet 175 can thereby function to bridge packet-switched data communications between UE N and UEs 1 . . . N via the core network 140. Also shown in FIG. 1 is the access point 125 that is separate from the RAN 120. The access point 125 may be connected to the Internet 175 independent of the core network 140 (e.g., via an optical communication system such as FiOS, a cable modem, etc.). The air interface 108 may serve UE 4 or UE 5 over a local wireless connection, such as IEEE 802.11 in an example. UE N is shown as a desktop computer with a wired connection to the Internet 175, such as a direct connection to a modem or router, which can correspond to the access point 125 itself in an example (e.g., for a WiFi router with both wired and wireless connectivity).

The core network 140 is configured to support one or more communication services (e.g., Voice-over-Internet Protocol (VoIP) sessions, Push-to-Talk (PTT) sessions, group communication sessions, social networking services, etc.) for UEs that can connect to the core network 140 via the RANs 120 and/or via the Internet 175, and/or to provide content (e.g., web page downloads) to the UEs.

Referring to FIG. 1, a server 170 is shown as connected to the Internet 175, the core network 140, or both. The server 170 can be implemented as a plurality of structurally separate servers, or alternately may correspond to a single server.

The wireless communication network 100 may provide for multi-user to multi-device capabilities. That is, the same user may utilize multiple different devices to access the wireless communication network 100 and multiple different users may utilize the same device to access the wireless communication network 100. For example, as shown in FIG. 1, user1 may utilize UE2 as well as UE3 to access wireless communication network 100. Similarly, user2 may utilize the same UE3 as well as a different UE (i.e., UE4) to access the wireless communication network 100.

As mentioned above, access networks using various communication protocols (e.g., 3GPP access networks such as W-CDMA, LTE, etc., or non-3GPP access networks such as WiFi, WLAN or wired LAN, IEEE 802, IEEE 802.11, etc.) can be configured to provide Internet Protocol (IP) Multimedia Subsystem (IMS) services via an IMS network managed by a mobile network operator (MNO) to users across a communications system. Users that access the IMS network to request an IMS service are assigned to one of a plurality of regional application servers or application server clusters (e.g., groups of application servers that serve the same cluster region) for supporting the requested IMS service.

Figure 2:
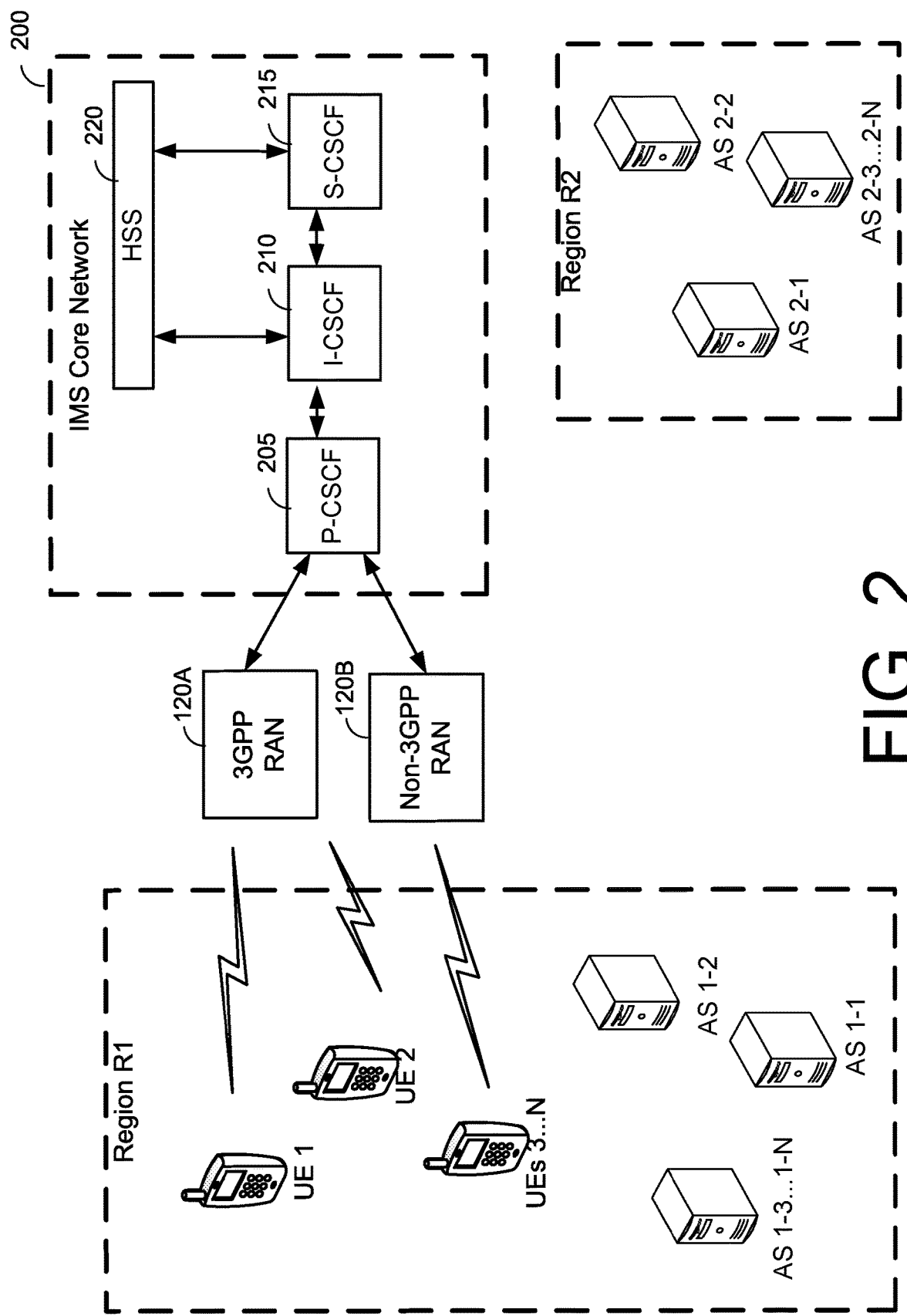
FIG. 2 illustrates an example of an Internet Protocol (IP) multimedia subsystem (IMS) session architecture.

FIG. 2 illustrates an example of an IMS architecture. In one example, an IMS core network is provided within core network 140 of FIG. 1, and application servers AS 1-1, AS 1-2 . . . AS 1-N and AS 2-1, AS 2-2 . . . AS 2-N are represented by application server 170 of FIG. 1. With respect to FIG. 2, assume that a first cluster of application servers denoted as AS 1-1, AS 1-2 . . . AS 1-N is configured to provide IMS services to UEs and is located (or deployed) in a first region, and that a second cluster of application servers denoted as AS 2-1, AS 2-2 . . . AS 2-N configured to provide IMS service to UEs is located (or deployed) in a second region. While not shown in FIG. 2 explicitly, other clusters of application servers can be deployed in other cluster regions as well. In FIG. 2, each cluster of application servers is assumed to be operated by the same MNO. In FIG. 2, UEs 1 . . . N are assumed to be operating in cluster region R1 and are configured to connect either to a 3GPP RAN 120A (e.g., any of RANs 120 from FIG. 1) or a non-3GPP RAN 120B (e.g., a wired Ethernet connection, a WiFi connection such as AP 125, etc.). UEs 1 . . . N can then connect to an IMS network 200 through either the 3GPP RAN 120A or the non-3GPP RAN 120B.

The IMS network 200 is shown as illustrating a particular set of IMS components, including a proxy call session control function (P-CSCF) 205, an interrogating CSCF (I-CSCF) 210, a serving CSCF (S-CSCF) 215 and a Home Subscriber Server (HSS) 220. The P-CSCF 205, I-CSCF 210 and S-CSCF 215 are sometimes referred to collectively as the CSCF, and the CSCF is responsible for signaling via Session Initiation Protocol (SIP) between the Transport Plane, Control Plane, and the Application Plane of the IMS network 200.

In one aspect, P-CSCF 205 is responsible for interfacing directly with Transport Plane components and is the first point of signaling within the IMS network 200 for any end-point, such as UEs 1 . . . N. Once an endpoint acquires IP connectivity, the end point will cause a registration event to occur by first signaling to the P-CSCF 205. As the name implies, the P-CSCF 205 is a proxy for SIP messages from end-points to the rest of the IMS network 200. It is usually in a home network of the end point, but may reside in a visited network of the end point. The P-CSCF 205 will use a DNS look-up to identify a target I-CSCF 210 to send SIP messages, which could be an I-CSCF 210 in its own network or another I-CSCF across an administrative domain. The P-CSCF 205 can also be responsible for policy decisions (e.g., via an integrated or standalone Policy Decision Function (PDF) in Releases 5 or 6 of IMS, via a Policy Charging, and Resource Function (PCRF) in Release 7 of IMS, etc.).

Still referring to FIG. 2, one function of the I-CSCF 210 is to proxy between the P-CSCF 205 as entry point and S-CSCF 215 as control point for applications found in the Applications Plane. When the P-CSCF 205 receives a registration request SIP message, it will perform a DNS look-up to discover the appropriate I-CSCF 210 to route the message. Once the I-CSCF 210 receives the SIP message, it will perform a look-up operation with the HSS 220 via Diameter to determine the S-CSCF 215 that is associated with the end-point terminal. Once it receives this information, it will forward the SIP message to the appropriate S-CSCF 210 for further treatment.

The S-CSCF 215 is responsible for interfacing with the Application Servers (AS) (e.g., such as application servers 1-1, 1-2 . . . 1-N in cluster region R1, or application servers 2-1, 2-2 . . . 2-N in cluster region 2, and so on) in the Application Plane. Upon receiving a registration request SIP message from an I-CSCF 210, the S-CSCF 215 will query the HSS 220 via Diameter protocol to register the terminal as being currently served by itself. Subsequent session establishment requires knowing which S-CSCF 215 is responsible for the terminal session control. As part of the registration process, the S-CSCF 215 uses credentials it obtains from the query to the HSS 220 to issue an SIP message "challenge" back to the initiating P-CSCF 205 to authenticate the terminal.

In addition to acting as a registrar, the S-CSCF 215 is also responsible for routing SIP messages to the AS allowing for the Control Plane session control to interact with the Application Plane application logic. To do this, the S-CSCF 215 uses information obtained from the HSS 220 in the form of Initial Filter Criteria (IFC) that acts as triggers against inbound session establishment requests. The IFC includes rules that define how and where SIP messages should be routed to the various application servers that may reside in the Application Plane. The S-CSCF 215 may also act on Secondary Filter Criteria (SFC) obtained from the application servers during the course of messaging with them.

In one example, a UE that requests IMS service (e.g., registration to set-up or join a VoIP session, a PTT session, a group communication session, etc.) from the IMS network 200 is assigned (or registered) to a target application server that is selected by the S-CSCF 215, as noted above. Generally, the IMS network 200 will attempt to select, as the target application server, an application server that is physically close to the UE and is also known to be capable of providing the requested IMS service.

Figure 3:
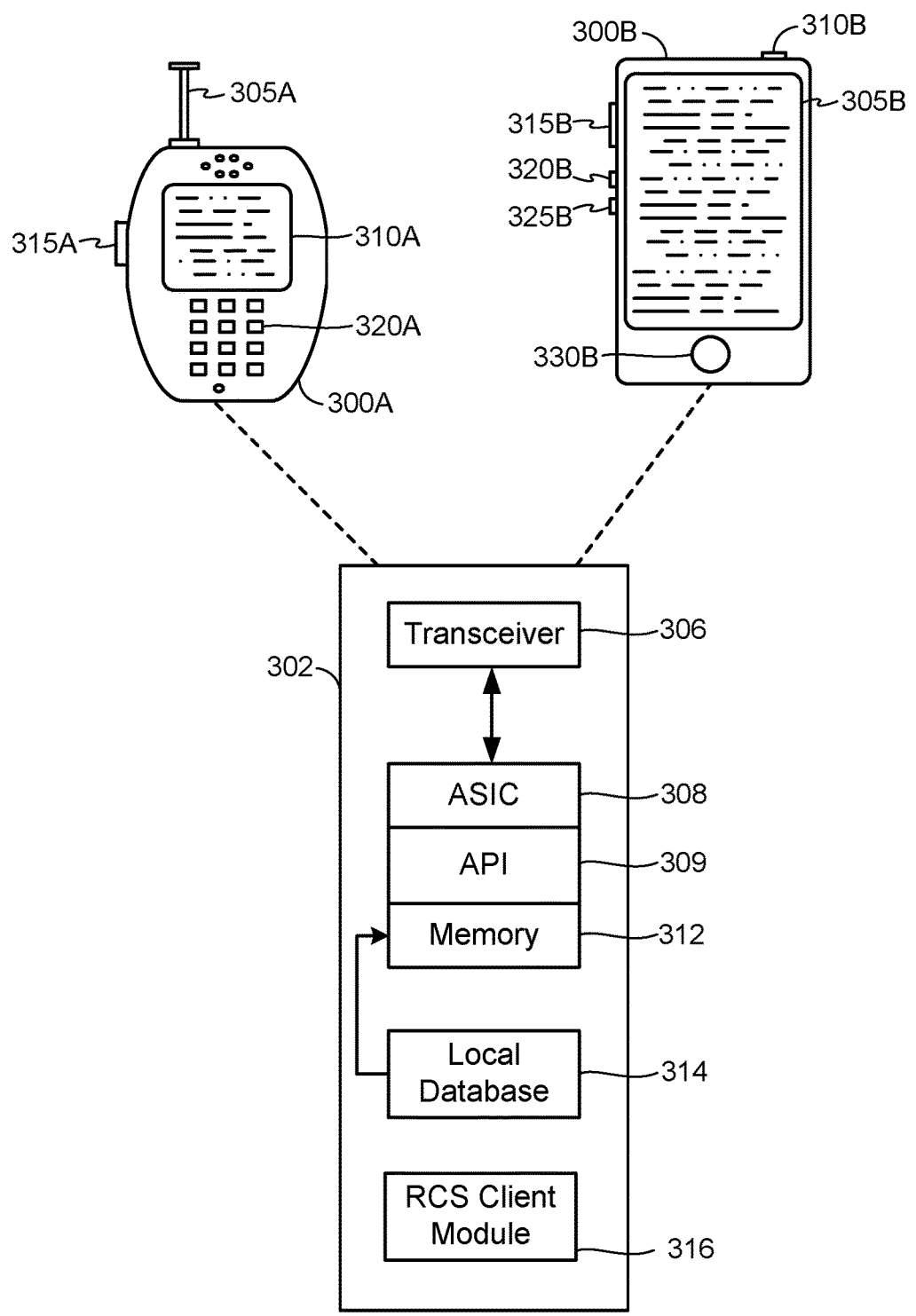
FIG. 3 illustrates examples of user equipments (UEs).

FIG. 3 illustrates examples of UEs (i.e., client devices) in accordance with embodiments of the invention. UEs 300A and 300B are possible implementations of any of the UEs 1-N of FIG. 1. Referring to FIG. 3, UE 300A is illustrated as a calling telephone and UE 300B is illustrated as a touchscreen device (e.g., a smart phone, a tablet computer, etc.). As shown in FIG. 3, an external casing of UE 300A is configured with an antenna 305A, display 310A, at least one button 315A (e.g., a PTT button, a power button, a volume control button, etc.) and a keypad 320A among other components, as is known in the art. Also, an external casing of UE 300B is configured with a touchscreen display 305B, peripheral buttons 310B, 315B, 320B and 325B (e.g., a power control button, a volume or vibrate control button, an airplane mode toggle button, etc.), at least one front-panel button 330B (e.g., a Home button, etc.), among other components, as is known in the art. While not shown explicitly as part of UE 300B, the UE 300B can include one or more external antennas and/or one or more integrated antennas that are built into the external casing of UE 300B, including but not limited to WiFi antennas, cellular antennas, satellite position system (SPS) antennas (e.g., global positioning system (GPS) antennas), and so on.

While internal components of UEs such as the UEs 300A and 300B can be embodied with different hardware configurations, a basic high-level UE configuration for internal hardware components is shown as platform 302 in FIG. 3. The platform 302 can receive and execute software applications, data and/or commands transmitted from the RAN 120 that may ultimately come from the core network 140, the Internet 175 and/or other remote servers and networks (e.g., application server 170, web URLs, etc.). The platform 302 can also independently execute locally stored applications without RAN interaction. The platform 302 can include a transceiver 306 operably coupled to an application specific integrated circuit (ASIC) 308, or other processor, microprocessor, logic circuit, or other data processing device. The ASIC 308 or other processor executes the application programming interface (API) 309 layer that interfaces with any resident programs in the memory 312 of the wireless device. The memory 312 can be comprised of read-only or random-access memory (RAM and ROM), EEPROM, flash cards, or any memory common to computer platforms. The platform 302 also can include a local database 314 that can store applications not actively used in memory 312, as well as other data. The local database 314 is typically a flash memory cell, but can be any secondary storage device as known in the art, such as magnetic media, EEPROM, optical media, tape, soft or hard disk, or the like.

Accordingly, an embodiment of the invention can include a UE (e.g., UE 300A, 300B, etc.) including the ability to perform the functions described herein. As will be appreciated by those skilled in the art, the various logic elements can be embodied in discrete elements, software modules executed on a processor or any combination of software and hardware to achieve the functionality disclosed herein. For example, the platform 302 is illustrated as including an RCS client module 316. In one aspect, RCS client module 316 may be configured to access an IMS network to request one or more IMS services (e.g., OGC communications). With regards to OGC communications, the RCS client module 316 may be configured to present a history of communications between parties. In some examples, RCS client module 316 may differentiate between outgoing messages and incoming messages, where outgoing messages are the messages sent by the user of the device and incoming messages are the messages received from other users. For example, outgoing messages may be displayed on one side of a display window and incoming messages may be displayed on the other side of the display window. In the case where multiple devices are associated with a single user, all communications originating from that user should be shown as outgoing, regardless of which of the user's devices actually sent the message and regardless of which of his or her devices the user is currently using.

Thus, in some aspects, the ASIC 308, memory 312, API 309, local database 314, and RCS client module 316 may all be used cooperatively to load, store and execute the various functions disclosed herein and thus the logic to perform these functions may be distributed over various elements. Alternatively, the functionality could be incorporated into one discrete component. Therefore, the features of the UEs 300A and 300B in FIG. 3 are to be considered merely illustrative and the invention is not limited to the illustrated features or arrangement.

The wireless communication between the UEs 300A and/or 300B and the RAN 120 can be based on different technologies, such as CDMA, W-CDMA, time division multiple access (TDMA), frequency division multiple access (FDMA), Orthogonal Frequency Division Multiplexing (OFDM), GSM, or other protocols that may be used in a wireless communications network or a data communications network. Voice transmission and/or data can be transmitted to the UEs from the RAN using a variety of networks and configurations. Accordingly, the illustrations provided herein are not intended to limit the embodiments of the invention and are merely to aid in the description of aspects of embodiments of the invention.

Figure 4:
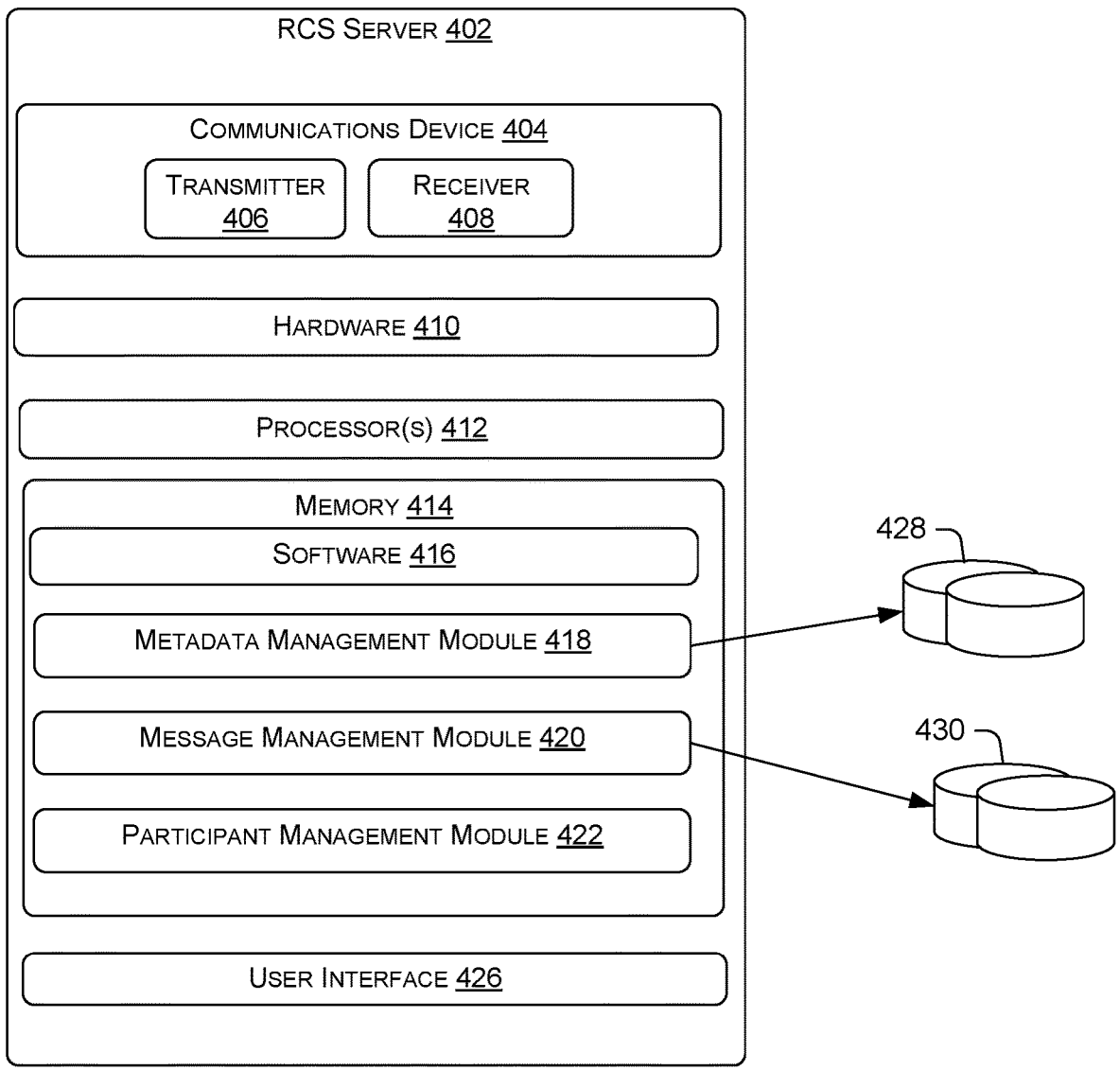
FIG. 4 illustrates an example Rich Communications Services (RCS) server.

FIG. 4 illustrates an example RCS server 402. RCS Server 402 is one possible implementation of Application server 170 of FIG. 1 and/or any of the application servers AS 1-1, AS 1-2 . . . AS 1-N or AS 2-1, AS 2-2 . . . AS 2-N of FIG. 2. The components illustrated in FIG. 4 may be implemented in different types of apparatuses in different implementations (e.g., in an ASIC, in an SoC, etc.). The illustrated components may also be incorporated into other apparatuses in a communication system. For example, other apparatuses in a system may include components similar to those described to provide similar functionality. Also, a given apparatus may contain one or more of the components. For example, an apparatus may include multiple transceiver components that enable the apparatus to operate on multiple carriers and/or communicate via different technologies.

The RCS server 402 may include at least one communication device (represented by the communication device 404) for communicating with other nodes. For example, the communication device 404 may comprise a network interface that is configured to communicate with one or more network entities via wire-based or wireless links. In some aspects, the communication device 404 may be implemented as a transceiver configured to support wire-based or wireless signal communication. This communication may involve, for example, sending and receiving: messages, parameters, or other types of information. Accordingly, in the example of FIG. 4, the communication device 404 is shown as comprising a transmitter 406 and a receiver 408.

The RCS server 402 may also include other components that may be used in conjunction with the operations as taught herein. For example, the RCS server 402 may include hardware 410, one or more processors 412, memory 414, and a user interface 426.

The hardware 410 may include additional hardware interfaces, data communications, and/or data storage hardware. For example, the hardware interfaces may include a data output device (e.g., visual display, audio speakers), and one or more data input devices. The data input devices may include, but are not limited to, combinations of one or more of keypads, keyboards, mouse devices, touch screens that accept gestures, microphones, voice or speech recognition devices, and any other suitable devices.

In addition, the RCS server 402 may include a user interface 426 for providing indications (e.g., audible and/or visual indications) to a user and/or for receiving user input (e.g., upon user actuation of a sensing device such a keypad, a touch screen, a microphone, and so on).

The memory 414 may be implemented using computer-readable media, such as computer storage media. Computer-readable media includes, at least, two types of computer-readable media, namely computer storage media and communications media. Computer storage media includes volatile and non-volatile, removable and non-removable, and non-transitory media, implemented in any method or technology for storage of information such as computer-readable instructions, data structures, program modules, or other data. Computer storage media includes, but is not limited to, RAM, ROM, EEPROM, flash memory or other memory technology, CD-ROM, digital versatile disks (DVD), high-definition multimedia/data storage disks, or other optical storage, magnetic cassettes, magnetic tape, magnetic disk storage or other magnetic storage devices, or any other non-transmission medium that can be used to store information for access by a computing device. In contrast, communication media may embody computer-readable instructions, data structures, program modules, or other data in a modulated data signal, such as a carrier wave, or other transmission mechanism.

The processor 412 of server 402 may execute instructions and perform tasks under the direction of software components that are stored in memory 414. For example, the memory 414 may store various software components that are executable or accessible by the one or more processors 412 of the server 402. The various components may include software 416, a metadata management module 418, a message management module 420, and a participant management module 422.

The software 416, metadata management module 418, message management module 420, and participant management module 422 may include routines, program instructions, objects, and/or data structures that perform particular tasks or implement particular abstract data types. For example, the metadata management module 418 may include one or more instructions, which when executed by the one or more processors 412 direct the RCS server 402 to perform operations related to maintaining metadata associated with a plurality of message threads as part of a OGC communications service. That is, the metadata management module 418 may be configured to create, edit, delete, and/or read metadata for each message thread that is provided by RCS server 402. In one example, the metadata management module 418 is configured to store the metadata to a storage device 428. In one example, the storage device 428 is included in memory 414 of RCS server 402.

In some aspects, the metadata associated with each message thread may include a thread identification (ID), a description of the message thread, a list of participants of the message thread, a locked status indicating whether the message thread is locked or unlocked, and a privacy level indicating whether the message thread is public, private, or semi-private.

As will be described in more detail below, the metadata management module 418 may be configured to receive a lock request from a participant (e.g., triggered by a user of an UE via an RCS client module 316 included in the UE). The metadata management module 418 may then modify the metadata (i.e., the locked status) associated with the message thread to lock the message thread such that no further users may join the message thread. The metadata management module 418 may also be configured to automatically lock a message thread based on the current number of participants of the message thread (e.g., if the number of participants exceeds a threshold number of participants).

Furthermore, the metadata management module 418 may be configured to verify that the participant who requested that a message thread be locked is in fact authorized to lock the message thread. In one aspect, only administrators of a message thread may be permitted to lock a message thread. In some examples, the administrator is the creator of the message thread and may be also referred to as the "chairman" or "chairperson" of the message thread. Thus, upon receiving a lock request, the metadata management module 418 may be configured to determine whether the participant who generated the lock request is an administrator of the message thread and only modify the metadata associated with the message thread if the participant is indeed the administrator.

The message management module 420 may include one or more instructions, which when executed by the one or more processors 412 direct the RCS server 402 to perform operations related to maintaining RCS messages associated with a plurality of message threads. In one example, the message management module 420 may receive a plurality of RCS messages from one or more participants of a message thread and store those RCS messages to a storage device 430. In one example, the storage device 428 is included in memory 414 of RCS server 402. In some aspects the RCS messages received by the message management module 420 may include session initiation protocol (SIP) messages and/or message session relay protocol (MSRP) messages generated by the RCS client module 316 of a UE.

The message management module 420 may further be configured to allow the storing and modification of previously stored RCS messages. For example, message management module 420 may receive a first RCS message from a UE and store the first RCS message to storage device 430. Subsequently, the message management module 420 may receive a request to modify the first RCS message from a participant of the associated message thread. In response, the message management module 420 may modify (e.g., edit or delete) the first RCS message stored in the storage device 430.

Still referring to FIG. 4, the participant management module 422 may include one or more instructions, which when executed by the one or more processors 412 direct the RCS server 402 to perform operations related to granting or rejecting requests to join a message thread. For example, in one aspect, the participant management module 422 may receive a request, from a user (e.g., USER1 by way of RCS client module 316) to join a particular message thread. The participant management module 422 may then determine whether the metadata associated with the requested message thread indicates that the message thread is locked or unlocked (e.g., via the locked status included in the metadata). If the metadata associated with the message thread indicates that the message thread is locked, then participant management module 422 may reject the request (i.e., prevent the user from joining the message thread).

In some aspects, the participant management module 422 may be further configured to notify an administrator of the message thread of the request by the user to join. For example, upon receiving a request to join a message thread, the participant management module 422 may send a notification of the request to the administrator of the message thread. In one aspect, sending the notification of the request to the administrator includes sending a notification to an RCS client module 316 residing on a UE associated with the administrator. The administrator may then grant or deny the request by way of the RCS client module 316, which then sends a response to the notification back to the participant management module 422. The participant management module 422 may then add the user to the list of participants associated with the message thread (i.e., as indicated in the metadata) in response to the administrator granting the request.

Figure 5:
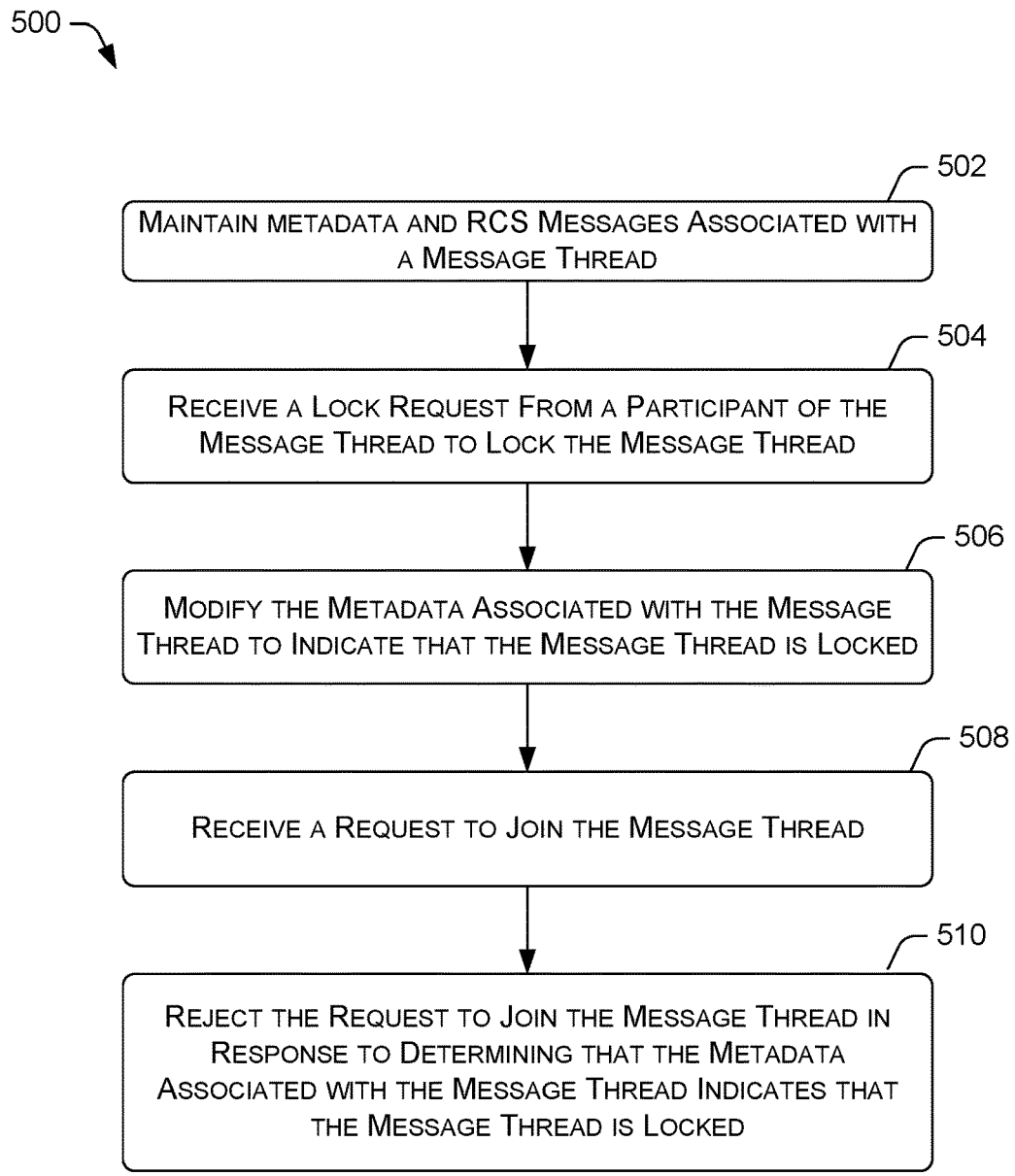
FIG. 5 is a flow diagram of an example process for locking open group chat (OGC) communications.

FIG. 5 is a flow diagram of an example process 500 for locking open group chat (OGC) communications. Process 500 is one possible process performed by RCS server 402 of FIG. 4. In a process block 502, the RCS server 402 maintains metadata and RCS messages associated with a message thread, where each message thread provides OGC communications among a plurality of participants. As mentioned above, maintaining metadata may include metadata management module 418 storing metadata associated with the message thread to storage device 428. Furthermore, maintaining RCS messages may include the message management module 420 storing one or more RCS messages associated with the message thread to storage device 430.

In a process block 504, the RCS server receives a lock request from a participant of the message thread, where the lock request is a request to lock the message thread to prevent further users from joining (either by way of a search performed by a user, or by way of a current participant inviting another user to join). As described above, the lock request may be generated by an RCS client module 316 of a UE and received at the metadata management module 418 via any of the various interfaces illustrated in the communications network 100 of FIG. 1.

Next, in process block 506, the metadata management module 418 may modify the metadata associated with the message thread to indicate that the message thread is locked in response to the lock request. In one aspect, process block 506 may include the metadata management module 418 first determining whether the lock request is received from an administrator of the message thread before modifying the metadata.

In a process block 508, a request to join the message thread is received at the RCS server 402. In one aspect, the request to join the message thread may be generated by the RCS client module 316 in response to a query for a thread ID of the message thread. In another aspect, the request to join the message thread may be generated in response to an invitation generated by a current participant for another user to be joined to the message thread. In various examples, invitations to add another user to an existing message thread may be managed server-side, and/or client-side.

By way of example, server-side management of invitations may include a current participant of a message thread generating a request to invite another user. The request may be generated by way of the RCS client module 316. The RCS client module 316 may then transmit the request to the RCS server 402 to be received by participant management module 422. The participant management module 422 then determines whether the metadata associated with the requested message thread indicates that the message thread is locked or unlocked. If unlocked, an invitation is sent to the other user, where the invitation includes the thread ID of the message thread to allow the other user to join. In one aspect, the invitation may be sent by the RCS server 402 to the other user. In another example, the RCS server 402 may notify the RCS client module 316 of the current participant that the RCS client module 316 may send the invitation itself (e.g., via an out-of-band communication).

If, however, the participant management module 422 determines that the message thread is locked, the request to add the other user to the message thread is denied and no invitation is sent to the other user. In one example, the RCS server 402 may optionally send a message back to the current participant notifying them that the request was denied.

In some examples, client-side management of invitations may include the RCS client module 316 querying or syncing with the RCS server 402 to determine whether a message thread is locked or unlocked. Alternatively, or in addition thereto, the RCS server 402 may push a notification to RCS client modules 316 of participants of a message thread when that message thread becomes locked (e.g., in response to an administrator locking a message thread).

If the RCS client module 316 determines that the message thread is locked, it may prevent the participant from even generating a request to invite another user (e.g., by disabling that function on the RCS client module 316). If the message thread is unlocked, the RCS client module 316 may allow the participant to generate a request to invite another user to join the message thread. In one aspect, the invitation may be sent directly from the current participant to the other user (e.g., via out-of-band communications) or the RCS client module 316 may communicate with the RCS server 402 to trigger the RCS server 402 to send the invitation, itself, to the other user.

As mentioned above, the request to join the message thread may be received by participant management module 422 and may include the participant management module 422 determining whether the metadata associated with the requested message thread indicates that the message thread is locked or unlocked. If the message thread is unlocked, the participant management module 422 may grant access to the message thread and add the requesting user as a participant of the message thread. If, however, the message thread is locked, the participant management module 422 may reject the request to join the message thread (i.e., process block 510).

In some examples, if the message thread is locked, rather than automatically rejecting the request to join a message thread (either directly via a search performed by a user or by way of a current participant requesting that another user be joined), the participant management module 422 may send a notification of the request to an administrator of the message thread to allow the administrator the ability to grant or reject the request.

Figure 6:
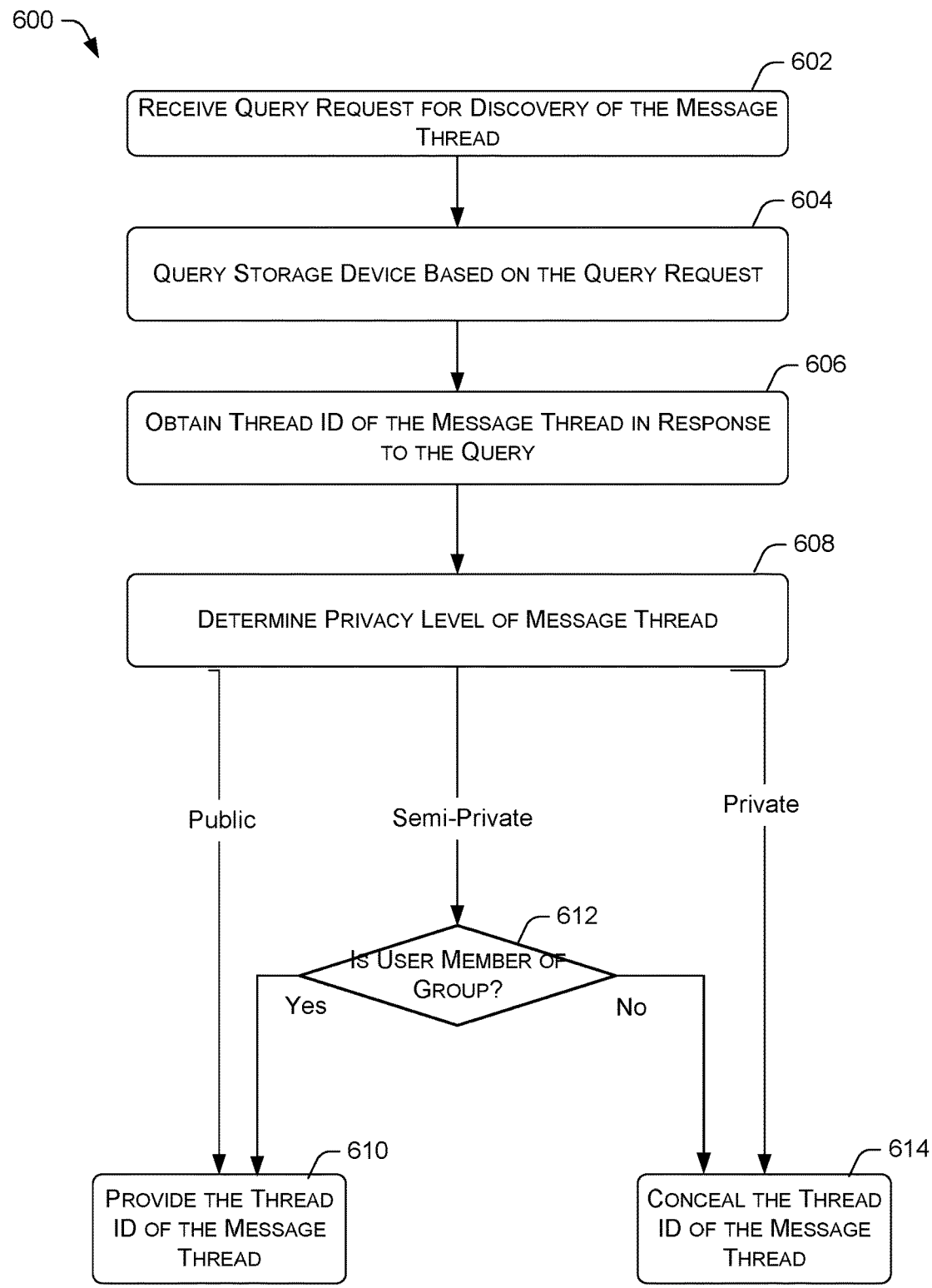
FIG. 6 is a flow diagram of an example for processing a query request for discovery of a message thread.

FIG. 6 is a flow diagram of an example for processing a query request for discovery of a message thread. Process 600 is one possible process performed by RCS server 402 of FIG. 4. As mentioned above, the metadata associated with a message thread may include a variety of information, such as a description of the message thread. In one example, the description of the message thread provides the creator (e.g., Administrator, Chairman, etc.) to add searchable text to a message thread that would not normally be in the subject field of the message thread or where a user may not want the text in the subject field. Thus, in process block 602, the RCS server 402 receives a query request that may include text entered by a user for searching available message threads. Upon receiving the query request, the RCS server 402 may query the storage device 428 with the text to find related message threads (i.e., process block 604). In one aspect, querying the storage device 428 may include searching the description and/or subject fields of all currently maintained message threads to obtain their corresponding thread IDs (i.e., process block 606).

Next, in process block 608, the RCS server 402 determines a privacy level of the message thread associated with the thread ID obtained as a result of the query. As mentioned above, the privacy level of a message thread may be incorporated into the associated metadata and may indicate whether the message thread is public, private, or semi-private. In some aspects, a privacy level of 'public' indicates that the message thread is discoverable to all users. Thus, if the privacy level is determined to be public, then process 600 proceeds to process block 610 where the thread ID is provided to the user who generated the query request. If, however, the privacy level is determined to be private, then process 600 proceeds to process block 614 where the thread ID is concealed from the user. In one example, concealing the thread ID means that the RCS server 402 does not provide the thread ID to the requesting user. In some aspects, concealing the thread ID from the user may include the RCS server 402 returning a 'null' response to the query request received from the user.

In addition, the privacy level associated with a message thread may indicate that the message thread is semi-private. A semi-private privacy level may be utilized for a particular message thread where an administrator of the message thread desires to limit participation in the message thread to members of a particular group (e.g., limit participation only to employees of a company, members of a project, etc.). Thus, if RCS server 402 determines that the privacy level is semi-private, the process 600 proceeds to decision block 612, where it is determined whether the requesting user is indeed a member of the group associated with the message thread. If so, then RCS server 402 may provide the thread ID to the user (process block 610), and if not, may conceal the thread ID from the user (process block 614).

In one aspect, obtaining the thread ID is required before a user can request to join a particular message thread. Thus, process 600 may be performed prior to process block 508, where a user requests to join the message thread. Accordingly, aspects of the present disclosure may include a searchable public OGC message thread, but still enable the locking of the message thread.

CONCLUSION

Although the subject matter has been described in language specific to structural features and/or methodological acts, it is to be understood that the subject matter defined in the appended claims is not necessarily limited to the specific features or acts described. Rather, the specific features and acts are disclosed as exemplary forms of implementing the claims.

What is claimed is:

1. A method performed by a rich communications services (RCS) server, the method comprising:
    maintaining metadata and RCS messages associated with a message thread, wherein the message thread provides open group chat (OGC) communications among a plurality of participants;
    receiving a lock request from one of the plurality of participants of the message thread to lock the message thread;
    modifying the metadata associated with the message thread to indicate that the message thread is locked in response to the lock request;
    receiving, from a user, a request to join the message thread; and
    rejecting the request to join the message thread in response to determining that the metadata associated with the message thread indicates that the message thread is locked.

2. The method of claim 1, wherein the metadata associated with the message thread comprises a thread identification (ID), a description of the message thread, a list of participants of the message thread, a locked status indicating whether the message thread is locked or unlocked, and a privacy level indicating whether the message thread is public, private, or semi-private.

3. The method of claim 2, wherein maintaining the metadata comprises storing the metadata to a storage device, the method further comprising:
    receiving a query request from the user for discovery of the message thread;
    querying the storage device based on the query request;
    obtaining the thread ID of the message thread in response to the querying of the storage device; and
    providing, to the user, the thread ID of the message thread in response to determining that the metadata associated with the message thread indicates that the privacy level for the message thread is public.

4. The method of claim 2, wherein maintaining the metadata comprises storing the metadata to a storage device, the method further comprising:
    receiving a query request from the user for discovery of the message thread;
    querying the storage device based on the query request;
    obtaining the thread ID of the message thread in response to the querying of the storage device; and
    concealing, from the user, the thread ID of the message thread in response to determining that the metadata associated with the message thread indicates that the privacy level for the message thread is private.

5. The method of claim 2, wherein maintaining the metadata comprises storing the metadata to a storage device, the method further comprising:
    receiving a query request from the user for discovery of the message thread;
    querying the storage device based on the query request;
    obtaining the thread ID of the message thread in response to the querying of the storage device;
    providing, to the user, the thread ID of the message thread in response to determining that the metadata associated with the message thread indicates that the privacy level for the message thread is semi-private and that the user is a member of a group of authorized to participate in the message thread; and
    concealing, from the user, the thread ID of the message thread in response to determining that the metadata associated with the message thread indicates that the privacy level for the message thread is semi-private and that the user is not a member of the group of authorized to participate in the message thread.

6. The method of claim 1, wherein the RCS messages comprise at least one of session initiation protocol (SIP) messages or message session relay protocol (MSRP) messages.

7. The method of claim 1, wherein receiving the lock request from the one of the plurality of participants to lock message thread comprises determining whether the one of the plurality of participants is an administrator of the message thread, and wherein modifying the metadata associated with message thread to indicate that the message thread is locked comprises modifying the metadata in response to determining that the one of the plurality of participants is the administrator of the message thread.

8. The method of claim 7, further comprising:
    sending a notification of the request to join the message thread to the administrator of the message thread;
    receiving, from the administrator, a response to the notification; and
    adding the user to a list of participants associated with the message thread based on the response indicating that the administrator has granted the request.

9. The method of claim 1, wherein maintaining the RCS messages comprises storing the RCS messages to a storage device, the method further comprising:
    receiving a first RCS message;
    storing the first RCS message to the storage device;
    receiving a request to modify the first RCS message; and
    modifying the first RCS message stored in the storage device in response to the request.

10. The method of claim 9, wherein modifying the first RCS message comprises at least one of editing the first RCS message or deleting the first RCS message.

11. The method of claim 1, further comprising:
    determining a number of participants of the message thread; and
    modifying the metadata associated with the message thread to indicate that the message thread is locked in response to the number of participants exceeding a threshold.

12. A rich communications services (RCS) server, comprising:
    at least one processor; and
    at least one memory coupled to the at least one processor, the at least one memory having instructions stored therein, which when executed by the at least one processor, direct the RCS server to:
        store metadata and RCS messages associated with a plurality of message threads to a storage device, wherein each message thread of the plurality of message threads provides open group chat (OGC) communications among a plurality of participants;

receive a lock request from a participant of at least one message thread of the plurality of message threads to lock the at least one message thread;

modify the metadata associated with the at least one message thread to indicate that the at least one message thread is locked;

receive a query request from a user for discovery of the at least one message thread;

query the storage device based on the query request;

obtain a thread ID of the at least one message thread in response to the querying of the storage device;

provide, to the user, the thread ID of the at least one message thread in response to determining that the at least one message thread is a public message thread;

receive, from the user, a request to join the at least one message thread; and reject the request to join the at least one message thread in response to determining that the metadata associated with the at least one message thread indicates that the at least one message thread is locked.

13. The RCS server of claim 12, wherein the RCS messages comprise session initiation protocol (SIP) messages.

14. The RCS server of claim 12, wherein the RCS messages comprise message session relay protocol (MSRP) messages.

15. The RCS server of claim 12, wherein the metadata associated with the at least one message thread comprises the thread ID, a description of the at least one message thread, a list of participants of the at least one message thread, a locked status indicating whether the at least one message thread is locked or unlocked, and a privacy level indicating whether the at least one message thread is public, private, or semi-private.

16. The RCS server of claim 12, wherein instructions further direct the RCS server to:

send a notification of the request to join the at least one message thread to an administrator of the at least one message thread in response to determining that the at least one message thread is locked;

receive, from the administrator, a response to the notification; and add the user to a list of participants associated with the at least one message thread based on the response indicating that the administrator has granted the request.

17. One or more non-transitory computer-readable media storing computer-executable instructions, which when executed by the at least one processor of a rich communications services (RCS) server, direct the RCS server to:

maintain metadata associated with a message thread, wherein the message thread provides open group chat (OGC) communications among a plurality of participants;

receive a plurality of RCS messages associated with the message thread, wherein the plurality of RCS messages comprise session initiation protocol (SIP) messages and message session relay protocol (MSRP) messages;

receive a lock request from a participant of the message thread to lock the message thread;

modify the metadata associated with the message thread to indicate that the message thread is locked;

receive, from a user, a request to join the message thread; and reject the request to join message thread in response to determining that the metadata associated with the message thread indicates that the message thread is locked.

18. The one or more non-transitory computer-readable media of claim 17, wherein the instructions further direct the RCS server to:

store the metadata to a storage device;

receive a query request from the user for discovery of the message thread;

query the storage device based on the query request;

obtain a thread identification (ID) of the message thread in response to the query of the storage device; and provide, to the user, the thread ID of the message thread in response to determining that the metadata associated with the message thread indicates that the privacy level for the message thread is public, wherein the request to join the message thread is received in response to providing the user with the thread ID.

19. The one or more non-transitory computer-readable media of claim 17, wherein the instructions further direct the RCS server to:

send a notification of the request to join the message thread to an administrator of the message thread in response to determining that the message thread is locked;

receive, from the administrator, a response to the notification; and add the user to a list of participants associated with the message thread based on the response indicating that the administrator has granted the request.

20. The one or more non-transitory computer-readable media of claim 17, wherein the metadata associated with the message thread comprises a thread identification (ID), a description of the message thread, a list of participants of the message thread, a locked status indicating whether the message thread is locked or unlocked, and a privacy level indicating whether the message thread is public, private, or semi-private.

* * * * *